United States Patent
Kirsch et al.

(10) Patent No.: US 10,866,644 B2
(45) Date of Patent: Dec. 15, 2020

(54) OPERATING UNIT FOR A VEHICLE COMPONENT, IN PARTICULAR HUMAN-MACHINE INTERFACE FOR A VEHICLE

(71) Applicant: Behr-Hella Thermocontrol GmbH, Stuttgart (DE)

(72) Inventors: Stefan Kirsch, Soest (DE); Tobias Schwab, Paderborn (DE); Jan Henning Kessler, Bielefeld (DE); Sascha Langener, Lippborg (DE)

(73) Assignee: Behr-Hella Thermocontrol GmbH, Stuttgart (DE)

( * ) Notice: Subject to any disclaimer, the term of this patent is extended or adjusted under 35 U.S.C. 154(b) by 0 days.

(21) Appl. No.: 16/485,482

(22) PCT Filed: Feb. 16, 2018

(86) PCT No.: PCT/EP2018/053927
§ 371 (c)(1),
(2) Date: Aug. 13, 2019

(87) PCT Pub. No.: WO2018/149988
PCT Pub. Date: Aug. 23, 2018

(65) Prior Publication Data
US 2020/0026357 A1    Jan. 23, 2020

(30) Foreign Application Priority Data

Feb. 16, 2017  (DE) .................. 10 2017 103 162
Feb. 16, 2017  (DE) .................. 10 2017 103 166
May 16, 2017  (DE) .................. 10 2017 208 243

(51) Int. Cl.
G06F 3/01      (2006.01)
B60K 37/06     (2006.01)
G06F 3/043     (2006.01)

(52) U.S. Cl.
CPC ............. *G06F 3/016* (2013.01); *B60K 37/06* (2013.01); *G06F 3/043* (2013.01); *G06F 3/0436* (2013.01);
(Continued)

(58) Field of Classification Search
CPC combination set(s) only.
See application file for complete search history.

(56) References Cited

U.S. PATENT DOCUMENTS 9,436,284 B2   9/2016   Hudin et al.
9,449,476 B2   9/2016   Lynn et al.
(Continued)

FOREIGN PATENT DOCUMENTS

EP  2 397 933 A2   12/2011
EP  2 684 111 A1   1/2014
JP  2016 095552 A  5/2016

OTHER PUBLICATIONS

Hudin, et al., *Localized Tactile Feedback on a Transparent Surface Through Time-Reversal Wave Focusing*, IEEE Transactions on Haptics, 8(2):188-198, 2015.
(Continued)

*Primary Examiner* — Robin J Mishler
(74) *Attorney, Agent, or Firm* — Renner, Otto, Boisseile & Sklar, LLP

(57) ABSTRACT

The operating unit (10) for a vehicle component is provided with a housing (14) having a frame (16) and a display (62) having a transparent cover pane (18) with an edge (22). A plurality of actuators (24) for introducing flexural waves into the cover pane (18) is arranged along the edge (22) of the cover pane (18). A contact surface (34) is assigned to each actuator (24) on the cover pane (18), by means of which contact surface the actuator (24) acts on the cover pane (18) in order to introduce flexural waves into the cover pane (18). The flexural waves introduced into the cover pane (18) by the actuators (24) are superposed in the cover pane (18) and give the cover pane (18) a tactilely sensible, locally resolved surface structure. The contact surfaces (34) are each arranged at a distance from the frame (16) of the housing (14), and consequently the introduction of flexural waves
(Continued)

Figure 1:
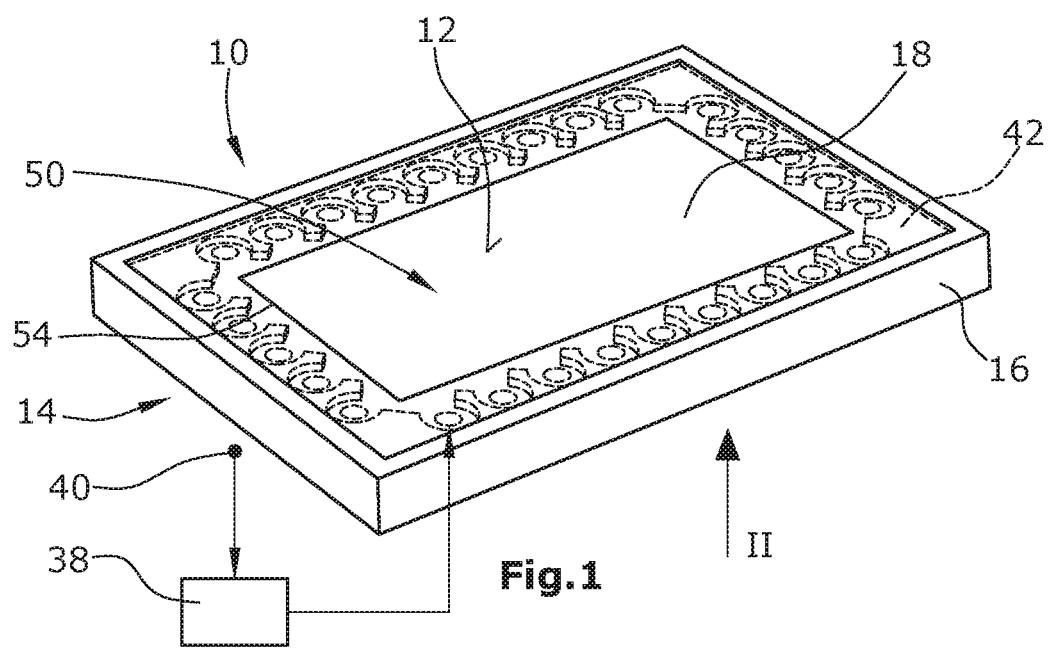

into the cover pane (18) and/or the propagation of flexural waves in the cover pane (18) is damped for wavelengths or frequencies resulting from the magnitude of the distance. The distance is selected in such a way that flexural waves having frequencies in the audible frequency range are damped.

17 Claims, 6 Drawing Sheets

(52) U.S. Cl.
CPC ............... *B60K 2370/1438* (2019.05); *B60K 2370/158* (2019.05)

(56) References Cited

U.S. PATENT DOCUMENTS

| | | |
|---|---|---|
| 9,477,350 B2 | 10/2016 | Sheng et al. |
| 10,108,268 B2 | 10/2018 | Harris |
| 2011/0310028 A1 | 12/2011 | Camp, Jr. et al. |
| 2013/0127755 A1 | 5/2013 | Lynn et al. |
| 2017/0168601 A1* | 6/2017 | Pellikka ............... G06F 3/0416 |

OTHER PUBLICATIONS

International Search Report and Written Opinion for corresponding International Application No. PCT/EP2018/053927 dated May 30, 2018.

\* cited by examiner

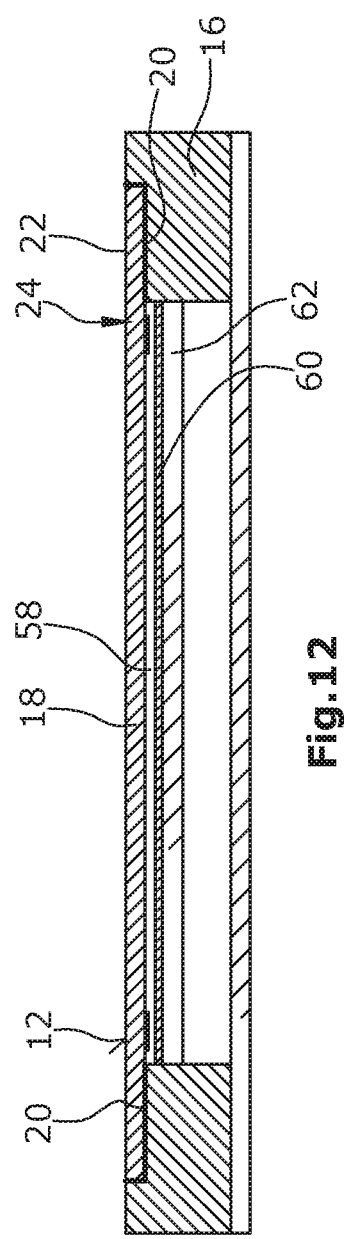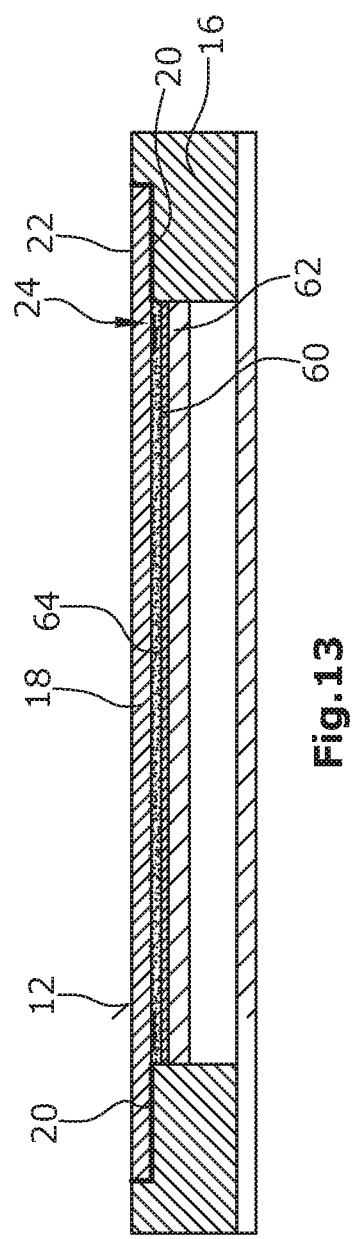

OPERATING UNIT FOR A VEHICLE COMPONENT, IN PARTICULAR HUMAN-MACHINE INTERFACE FOR A VEHICLE

The present application claims priority to German patent applications 10 2017 103 162.6 of 16 Feb. 2017, 10 2017 103 166.9 of 16 Feb. 2017 and 10 2017 208 243.7 of 16 May 2017, the contents of which are hereby incorporated by reference into the present patent application.

The invention relates to an operating unit for a vehicle component as, for example, a human-machine-interface (HMI) with locally resolved haptics for confirming a manual operation. The invention particularly relates to noise suppression for haptic feedback by means of flexural waves. The operating unit can not only be used for vehicle components or in a vehicle but also for other touchscreen input devices.

Entering commands for operating vehicle components by means of a touchscreen or a touchpad is becoming increasingly popular. For reasons of convenience, it is desirable that the person receives feedback of the effective input of a command, i.e. the effective manual operation. In this regard, so-called haptic feedback concepts with a tactile feedback have proven to be effective. In this case, the touch panel or the touchscreen as a whole is excited mechanically, wherein a vibration should be reduced to a minimum also for reasons of comfort. Ideally, the touch panel or the touchscreen deflects briefly only once in order to then remain in the resting position.

Particularly for larger touchscreen, which are increasingly installed in vehicles, the conventional concepts of haptic feedback are disadvantageous due to the increasing weight of the components to be moved.

It is known that for haptic feedback on touch-sensitive surfaces flexural waves must be impressed therein. This is for example described in EP 2 684 111 A1, U.S. Pat. No. 9,436,284 B2 and U.S. Pat. No. 9,449,476 B2. In the known methods, actuators are used for impressing flexural waves into, for example, a pane such as the cover pane of a touchscreen. Piezo actuators are used, inter alia, as actuators, which either have a single layer or multiple layers (so-called multi-layer piezo elements).

Such piezoceramic elements (hereinafter referred to as piezo element) are generally known and in order to impress flexural waves, for example, into a cover pane, they are connected to the cover pane in a shear-resistant manner, e.g. by adhesive bonding. Due to the extension of the piezo elements during electrical activation, the piezo elements deform the cover pane locally so that a flexural wave can propagate in the cover pane. By superposing the actuators (control patterns) controlled in different manners and at different times, a tactilely sensible, locally resolved surface structure, which can be configured variously or identically at different positions, can be impressed into the cover pane.

Theoretical foundations for controlling actuators can be found in the paper "Localized Tactile Feedback on a Transparent Surface through Time-Reversal Wave Focusing" by Hudin et al. (DOI: 10.1109/TOH.2015.2411267).

A certain disadvantage of the haptic feedback by means of flexural waves is the disturbing noise generation. The reason for this is that the vibrations generated by the flexural waves are audible within a frequency domain of a few Hz to about 16,000 Hz to 20,000 Hz.

The object of the invention is to create an operating unit with a touch-sensitive operating surface with noise suppression for haptic feedback by means of flexural waves.

According to the invention, the object of the invention is achieved by an operating unit for a vehicle component, in particular a human-machine interface (HMI) for a vehicle, wherein the operating unit is provided with a housing with a frame, a display arranged in and/or at the housing with a transparent cover pane having an edge which is rigidly enclosed by the frame, a touch sensor system arranged in and/or at the housing, and a plurality of actuators arranged adjacently along the edge of the cover pane for introducing flexural waves into the cover pane, wherein each actuator on the cover pane is assigned to a contact surface by means of which the actuator acts on the cover pane in order to introduce flexural waves into the cover pane, wherein the flexural waves introduced by the actuators into the cover pane are superposed in the cover pane and impulsively provide the cover pane with a tactilely sensible, locally resolved surface structure which can be various or identical at different positions of the cover pane, wherein the contact surfaces are each arranged at a distance from the frame of the housing, and consequently the introduction of flexural waves into the cover pane and/or the propagation of flexural waves in the cover pane is damped for wavelengths or frequencies resulting from the magnitude of the distance, and wherein the distance is selected in such a way that flexural waves having frequencies in the audible frequency range are damped, and an evaluation and control unit connected to the touch sensor system and the actuators for controlling the touch sensor system in order to evaluate the signals provided by the touch sensor system, and for controlling the actuators depending on the signals provided by the touch sensor system.

Individual embodiments of the invention are subject of the dependent claims.

Thus, the object of the invention is an arrangement of actuators along the edge of an operating surface carrier of the operating unit (hereinafter also referred to as "cover pane" or "cover glass"). It should be underlined that the terms "cover pane" and "cover glass" are synonymously used for "operating surface" in the context of the invention. According to the invention, the distance of the actuators to the edge of the cover pane and thus to the frame rigidly enclosing the cover pane is selected in such a way that the generation of flexural waves with frequencies in the audible frequency range (e.g. up to 20,000 Hz) is suppressed as much as possible, i.e. the propagation of such flexural waves is largely damped. This is explained in the following.

The invention makes use of the concept of impressing flexural waves into the operating surface carrier, wherefore all actuators convert adapted, previously calculated and stored signals into locally limited mechanical excitations which superpose each other constructively at a defined time and position in the form of flexural waves and lie below a tangible threshold at other times and positions. Reflections at the edges are actively utilized by firmly restraining the cover pane in the frame. It is possible to superpose different signals for a simultaneous, constructive interference at several positions. There are methods in which the damping of the flexural waves by the influence of the finger(s) is considered.

When exciting flexural waves in the cover pane of a touchscreen or a touch panel for the purpose of haptic feedback, frequency components are usually generated that are easily audible to the human ear. Due to non-linear effects at the transition of the actuators to the cover pane, these frequencies occur even with targeted filtering of the actuator excitation signals.

A flexural wave is usually impressed near the edge of the cover pane. If this edge is fixedly restrained, i.e. it cannot be moved in any spatial direction, it can be achieved, by adjusting the distance of the edge or the frame of the cover pane to the actuator, that certain wavelengths (and thus certain frequencies) are strongly damped by the "rigid edge condition". At very small distances (in the magnitude order of millimeters for common material parameters for cover panes), the threshold at which longer wavelengths are strongly damped is just in the audible range. Only shorter wavelengths and thus higher (ultrasonic) frequencies can still be impressed into the cover pane with significant energy. The cover pane is usually made of hardened glass which is particularly suitable for the invention.

The distance between an actuator and the edge can be used to control for given material and geometry parameters which frequencies cannot be impressed as flexural waves or can only be impressed as damped flexural waves into the cover pane. Particularly the requirements of the automotive industry for break-proof and thus relatively thick cover glass can be met by a special, high-performance design of actuators and electronics.

In the following, the relation between material and geometry parameters and the smallest undamped impressable frequency is roughly indicated by means of formulas. It is assumed that the cover glass has the thickness d, the modulus of elasticity Y, the density ϑ and the Poisson's ratio v. The relation between wave-length λ and frequency f results in (cf. K. F. Graff, "Wave Motion in Elastic Solids", Courier Dover Publications, 1975):

$$f = \frac{\pi d}{\lambda^2} \sqrt{\frac{Y}{3\varrho(1-v^2)}}$$

If it is assumed that due to the rigid frame only waves with $$\frac{\lambda}{4} < a$$

can propagate almost without restrictions, the following rough estimation for the smallest frequency results, which can be included into the cover glass in the form of flexural waves without any restrictions:

$$f_{min} = \frac{\pi d}{16a^2} \sqrt{\frac{Y}{3\varrho(1-v^2)}}$$

Even smaller frequencies correspond to wavelengths which are greater than four times distance a and are thus damped mechanically by the proximity to the edge. It has to be considered that this damping in the limit range can be quite weak since in the extreme case the frame only comprises distance a to the actuator at one point. For small frequencies, i.e. greater wavelengths, a larger section of the frame participates in damping so that the damping is increasingly becoming stronger.

Distance a can thus be adjusted in such a way that a part of the audible spectrum is damped.

The arrangement can be understood as a mechanical filter for which the frequency response can be adjusted by the distance of the actuator to the (rigid) edge. From a practical point of view, the simpler way of high-pass filtering the control signal of the actuator with an electrical high-pass filter is not practicable, since the transition from the actuator (electrical) to the cover glass (mechanical) usually has a non-linear characteristic and thus mechanical waves in the audible spectrum are nevertheless generated.

The aforementioned distance which is selected according to the invention to suppress the generation or propagation of flexural waves with frequencies in the audible range, is the space between the frame and the respective contact surface on which the actuator is connected to the cover pane as shear-resistant as possible, wherein this distance must be considered in a direction orthogonal to the frame. The distance is particularly the space between the frame and the geometrical center of the contact surface which is suitably a circular surface; correspondingly the piezo elements are also designed as circular pane elements with a single layer or with multiple layers.

In a further suitable embodiment of the invention, it may be provided that the cover pane is glued to the frame, wherein the edge area of the cover pane rests on a support face of the frame and is glued to the cover pane in a full surface-contact. Thus, the frame encloses the cover pane rigidly. Alternatively, or additionally, the frame can also enclose the edge of the cover pane in a clamped manner.

Further examinations have shown that the flexural waves' frequency range to be damped can be adjusted and maintained more precisely by assigning a chamber to each actuator, and thus to each contact surface, along the edge of the cover pane in which the actuator or the contact surface is positioned. According to an advantageous embodiment of the invention, arms extend from the frame of the housing to the central area of the cover pane and are glued in a shear-resistant manner to the cover pane or bonded in another way. Due to the arms protruding substantially at right angles from the frame, individual chambers are formed along the frame with inner sides, at which each chamber has an opening, facing the central area of the cover pane. The arms, i.e. the lateral chamber walls, now also dampen or prevent the generation and propagation of flexural waves with undesirable frequencies. In this case, it also applies that the distance between the contact surface and the chamber walls is selected accordingly. It is advantageous for a circular contact surface that the chamber is also circular in plan view, wherein its chamber wall runs concentrically to the contact surface.

Suitably, the arms are provided with base sections by means of which they are connected to each other at their endings facing the frame. Thus, the arms and the chambers can be designed as a comb structure element which can be inserted into the frame and bonded to the cover pane as shear-resistant as possible. Suitably, the chamber openings extend over 60° to 120° and preferably over 90° of the circumference of the respective chamber and are arranged symmetrically to a center or symmetry axis of the chamber running orthogonally to the frame. Suitably, the chambers themselves are also symmetric to this axis.

Due to the "enclosure" of the individual actuators proposed according to this embodiment of the invention, the flexure waves in the audible frequency range do not, or only in a damped form, travel beyond the boundaries of the chambers. The selected distance between the actuator and the chamber boundary defines the damped frequency range so that it can be adjusted by selecting the diameter of the chamber (for round chambers) from which frequency the flexure waves can propagate in the cover glass (without any restrictions). In general, it can be said that the smallest impressable frequency decreases with a larger diameter, i.e. the greatest impressable frequency increases. It is not possible to indicate an exact relation by means of formulas, but it can be estimated via finite element simulations.

A further advantageous embodiment of the inventions relates to the "flexible" bonding of the cover glass to the display of the touchscreen or a touchpad. According to a suitable further embodiment of the invention, it is proposed to bond the cover glass to the front face of the display in a full surface contact by means of an elastic, flexible adhesive bond. The requirements for the adhesive bond are, as far as possible, 100% transparency, which has little or no noticeable influence on color reproduction, and a low modulus of elasticity. Materials suitable for adhesive bonding are materials that are used, for example, for optical bonding, wherein these materials should be flexible, elastic, softly stretchable and/or should have no or only a weak mechanical damping effect and/or can be gel-like, for example.

It can be concluded from the aforementioned that the invention can be used advantageously in touchscreens. Touchscreens comprise a touch panel which is normally placed directly below the cover glass. Touch panels usually work in a capacitive manner; however, touch panels working in an optical or resistive manner can also be used.

The touch panel can be bonded to the cover glass in a conventional manner. An elastic, flexible adhesive bond is not necessarily required for the largely undamped formation of flexure waves in the cover glass. Normally, the cover glass is coupled by means of the touch panel in full surface contact to the front face of the display. The touch panel itself can be formed in such a flexible and thin manner that it allows flexure waves to propagate in the cover glass without being damped too much by the touch panel. A rigid bond of the cover glass to the front face of the display (even if a touch panel is optionally placed between the two) should be avoided due to the too strong damping of the flexure waves by the rigid display, which can be avoided e.g. as described above by an air gap or by a flexible coupling.

The approach for haptic feedback in operating elements of a display according to the invention is based, as described above, on flexure waves in cover glass which provide haptic feedback but do not move the surface translatively. However, the more rigid the bonding mass, i.e. the higher its modulus of elasticity, the stronger the flexure waves are damped, thus preventing the implementation of this approach. Moreover, the mass to be moved effectively is significantly increased.

The described further embodiment of the invention thus relates to the specific use of an elastic bonding mass for a largely weak damping of flexure waves in the cover glass, so that the optical quality of the display system is still guaranteed and the propagation of flexure waves for practical relevant purposes becomes possible.

According to the current state of the art for flexure waves, the cover glass is solitary positioned by means of an air gap directly before the display so that the cover glass can vibrate freely. Thus, for example dirt and humidity can get into the air gap. Moreover, the air gap can negatively effect the optical characteristics by means of light reflections at the interfaces and the associated formation of "double" images, which can, however, be avoided/reduced by means of appropriate foils integrated into the display structure.

On the one hand, the optical disadvantage of the air gap can be avoided due to the elastic bonding mass. On the other hand, the largely undamped propagation of flexure waves is thus enabled.

In addition to the exploitation of flexure waves for generating haptic feedback, the combination of flexure waves with a flexible bonding mass can also be used for touch recognition and force measurement (force sense), wherein it should be underlined that providing a mechanical separation between the cover pane and the touch panel or the display, i.e. the component arranged below the cover pane, definitely ensures an improved propagation performance of flexure waves.

The invention can also be combined advantageously by means of ultrasound in combination with the detection of the touch point on the touch-sensitive operating surface. Such touch detection concepts are generally known and described, for example, in U.S. Pat. No. 9,449,476 B2 and U.S. Pat. No. 9,477,350 B2. For locally resolved touch detection by means of ultrasound, ultrasonic flexure waves are impressed into the cover pane, i.e. into the touch-sensitive operating surface, for example by means of piezo ultrasonic transmitters, wherein the propagation of flexure waves is particularly recognized by means of piezo ultrasonic receivers. At the moment at which the touch-sensitive operating surface is contacted by means of an object, for example a finger, the propagation of ultrasonic detection flexure waves is damped. The use of a plurality of ultrasonic transmitters and a plurality of ultrasonic receivers can then infer the touch point from the received signals and the position of the transmitters and receivers.

In this concept, it may also be advantageous to suppress certain frequencies of the detection flexure waves as described above. It can particularly be provided as an advantage that some of the actuators for the haptic flexure waves impression are previously used for impressing and receiving detection flexure waves. Since, according to the invention, actuators are arranged adjacently along advantageously the entire boundary of the cover pane, actuators are also located at the positions which are suitable for transmitting and receiving detection flexure waves for determining the touch point on the operating surface. Thus, some of the actuators arranged, according to the invention, along the edge of the cover pane can be used multiple times. The actuators, respectively the touch sensor system, is controlled and evaluated, according to the invention, by means of an evaluation and control unit as already described above in connection with the operating unit according to the invention.

The evaluation and control unit can also be exploited, for example, to determine the signals for controlling the actuators for the purpose of haptic feedback by means of flexure waves. In the following, an exemplary procedure is described with which these signals can be determined in advance:

aligning a laser vibrometer to the point at which feedback is to be generated;

exciting a single piezo element with one or a plurality of noise signals;

determining the transfer function between the excitation signal of the respective piezo element and the deflection at the selected point from the deflection measured with the laser vibrometer;

for this purpose, Fourier transformation of the excitation and measurement signal into the frequency domain and division of both spectra;

then, retransformation of the transfer function into the time domain (provides pulse response);

cutting out the first, particularly 2 ms of the pulse response and reversing the time axis;

restricting the determined signal to two discrete voltage levels by applying the signum function;

repeating the above steps at first for all other piezo elements;

repeating the entire aforementioned process for the desired number of points on the cover glass.

The signals (both the white noise for calibration purposes and the determined excitation signals) are saved and retrieved for further use, if necessary (e.g. finger recognized by touch foil or in periodic repetition).

To transform the voltage levels at the output of a microcontroller to the voltage levels $\pm V_{Piezo}$, electronic amplifier circuits known per se can be used.

Figure 4:
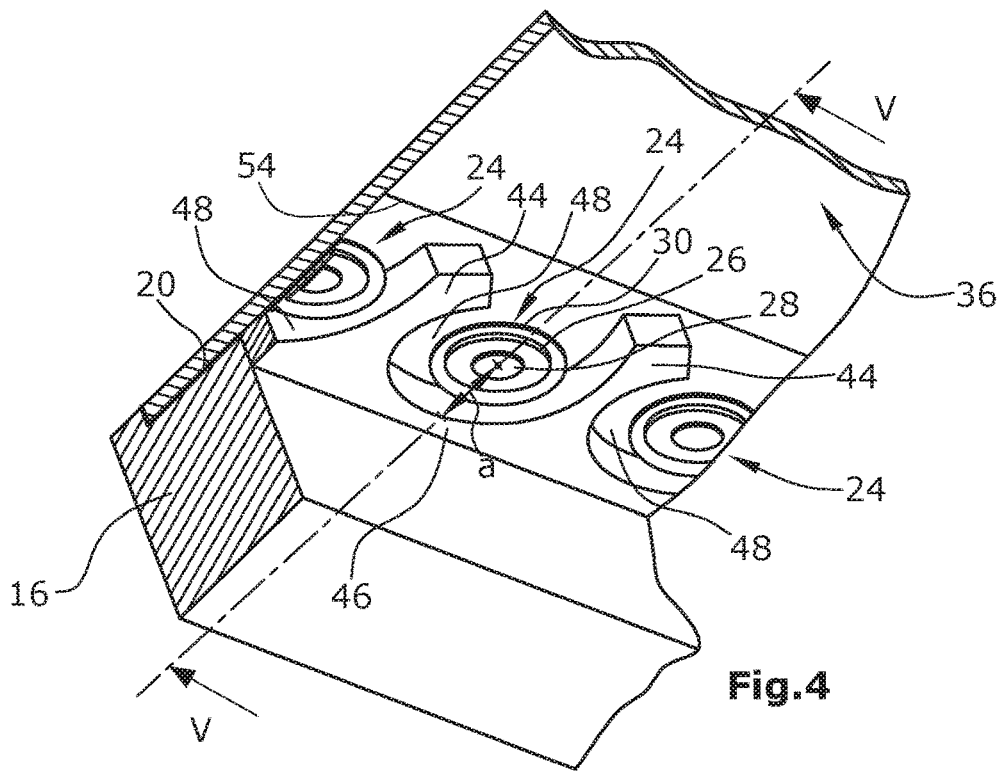
Figure 5:
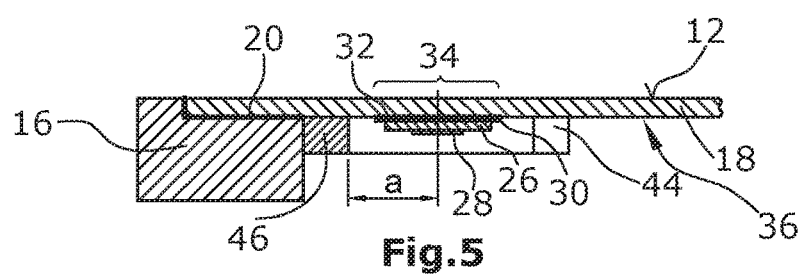

In the following, an exemplary embodiment of the invention is described in more detail with reference to the drawings. The individual figures show the following:

FIG. 1 perspective view on an operating unit with touch-sensitive operating surface, FIG. 2 bottom view on the operating unit, namely on its touch-sensitive operating surface from below, FIG. 3 perspective view (schematically) for illustrating a tactilely sensible, locally resolved surface structure of the operating surface as a result of impressing flexure waves and their superposition, FIG. 4 perspective view from below similar to the bottom view in FIG. 2, FIG. 5 sectional view along the line V-V of FIG. 4, FIGS. 6 to 11 simulation curve for illustrating the effect of the, according to the invention, provided different actions for noise suppression for haptic feedback of touch-sensitive operating surfaces by means of flexure waves, FIG. 12 schematic view of a touchscreen with cover glass arranged at a distance to the touch panel, and FIG. 13 schematic view similar to the one in FIG. 12 but with an air gap filled with an optical bonding mass between the cover glass, excited by means of flexure waves, and the touch panel of the touchscreen.

FIGS. 1 to 5 show different views on an operating unit 10 with a touch-sensitive operating surface 12. Operating unit 10 comprises a housing 14 with a frame 16 made of, for example, metal. Frame 16 encompasses a cover pane 18 made of, for example, hardened glass, which is glued to frame 16, for example, by means of an adhesive layer 20, and is thus rigidly bonded to it (see also FIGS. 4 and 5).

Figure 2:
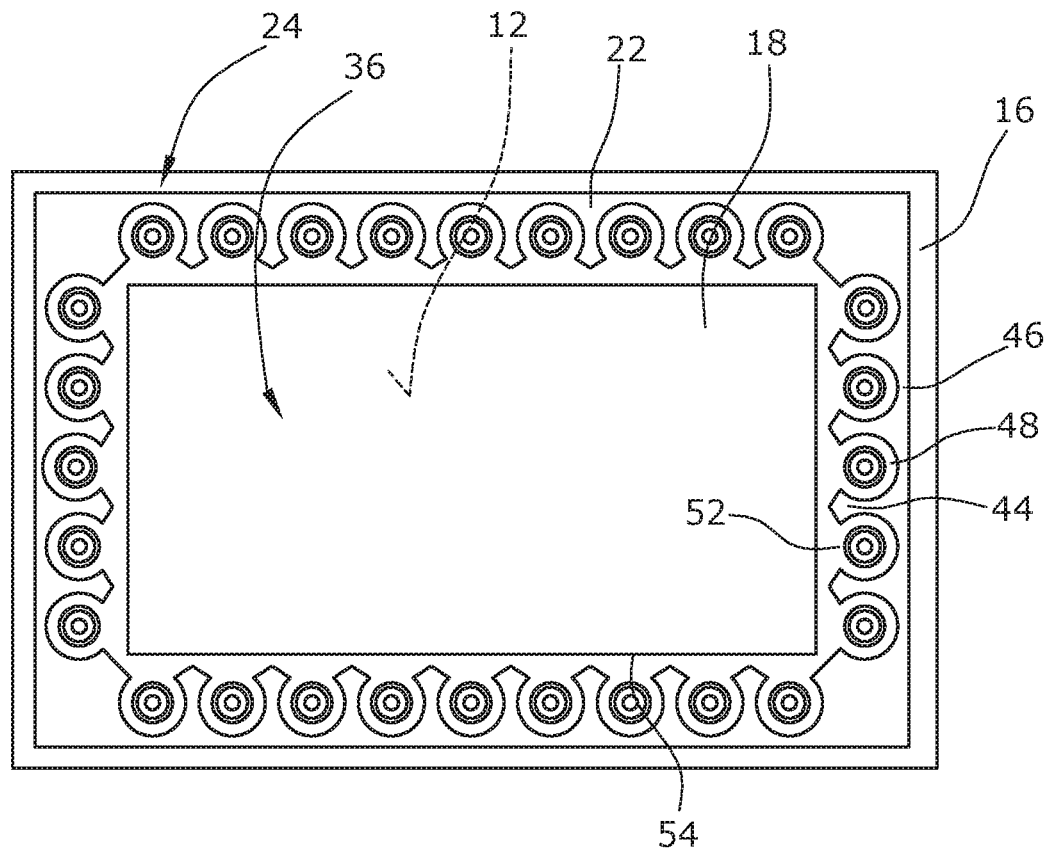

As can be seen in FIGS. 1 and 2, a plurality of actuators 24 is located along edge 22 of cover pane 18, and thus also along frame 16, in order to impress flexure waves into cover pane 18. Each of these actuators 24 is designed in the form of a circular disk, as can been seen in FIGS. 4 and 5. Each actuator 24 comprises a single-layer or a multi-layer, circular piezo element 26 which is provided on both sides with electrodes 28, 30, and in case of multi-layer piezo elements electrodes are also provided between the individual piezoceramic material layers. This sandwich structure is comparatively fixed in a shear-resistant manner by means of an adhesive bond 32 within a contact surface 34 at bottom face 36 of cover pane 18. The contacting of actuators 24 is not shown in the figures. FIG. 1 only schematically shows that operating unit 10 further comprises an evaluation and control unit 38 which receives signals from a touch sensor system (indicated in 40) and outputs control signals to the actuators 24, which is graphically shown in FIG. 1 for only one of the actuators 24.

In addition, the operating unit 10 comprises a frame-like comb structure element 42 which is preferably made of metal. This comb structure element 42 is formed as a circumferential frame and comprises a comb structure formed by a plurality of arms 44 running orthogonally to frame 16 or edge 22 with base sections 46 connecting the arms 44. Due to this comb structure, individual chambers 48 are formed in which respectively one actuator 24 is arranged. The chambers 48 are open to central area 50, wherein these openings extend over approximately 60° to 120°, particularly over 90°. In this exemplary embodiment, the chambers 48 are circularly formed and their chamber walls run concentrically to the actuators 24 at the inner sides. Comb structure element 42 can be designed as an element separated from frame 16, or comb structure element 42 with frame 16 are integrally formed as one part (in both variants e.g. by machining or casting).

By selecting distance a (see FIGS. 4 and 5) between the actuators 24 and their respective chamber wall, the frequency range can be affected in which flexure waves impressed by the actuators 24 into cover pane 18 are damped. This frequency range suitably comprises the audible range so that due to this action, namely the inclusion of the actuators 24 by the chambers, no audible frequencies are emitted, or the audible frequencies are only emitted in a damped form.

In FIGS. 1 and 2, a blackened edge area of cover pane 18 is shown at reference numeral 54 and shall cover the arrangement of the actuators 24 along the edge and comb structure element 42.

Figure 3:
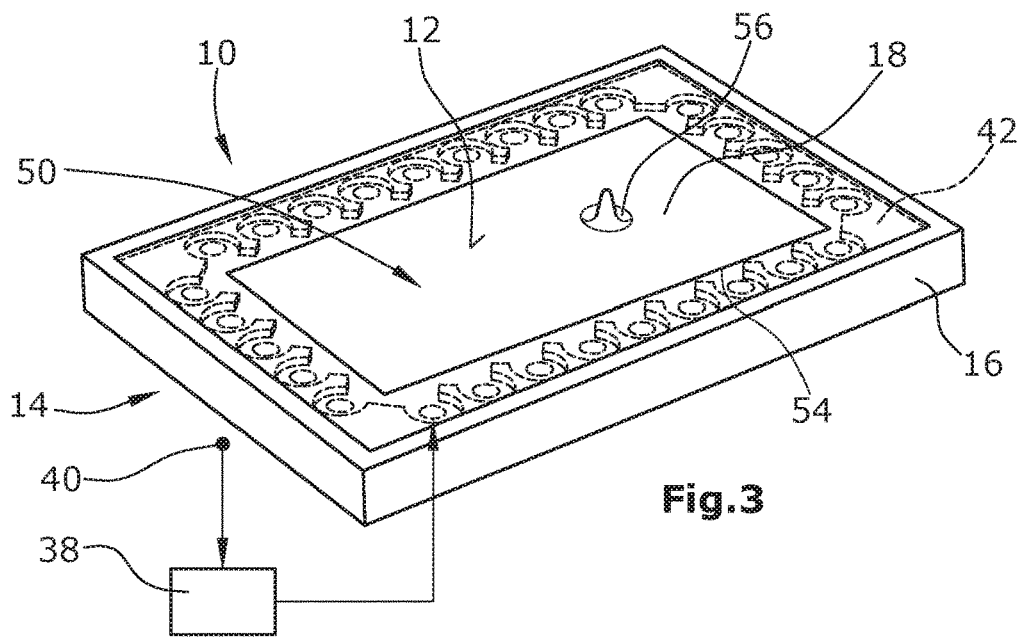

FIG. 3 schematically indicates how the possibly time-shifted control with different signals of the plurality of actuators 24 can be used to impress flexure waves into cover pane 18, wherein the superposition of flexure waves at a specific point 56 results in a brief, i.e. pulse-like existing noticeable "bump", which in turn can be sensed tactilely by the user, whose finger is (still) resting at point 56 on cover pane 18 due to the manual operation, and this is due to the brief "impact" in cover pane 18 at touch point 56.

The touch point can be detected by means of ultrasonic flexure waves which are generated and sensed by a few of the actuators 24 in a first phase of touching operating surface 12, in order to then infer the touch point by means of the sensed signals. The technique of detecting the touch point by means of ultrasonic waves is generally known. Alternatively, touch panels can be used as a touch sensor system. Normally, touchscreens in which the advantageous invention is used work with capacitive or resistive or optical touch panels arranged below cover pane 18. This is shown in FIGS. 12 and 13. The display itself is also shown in these figures.

Figure 6:
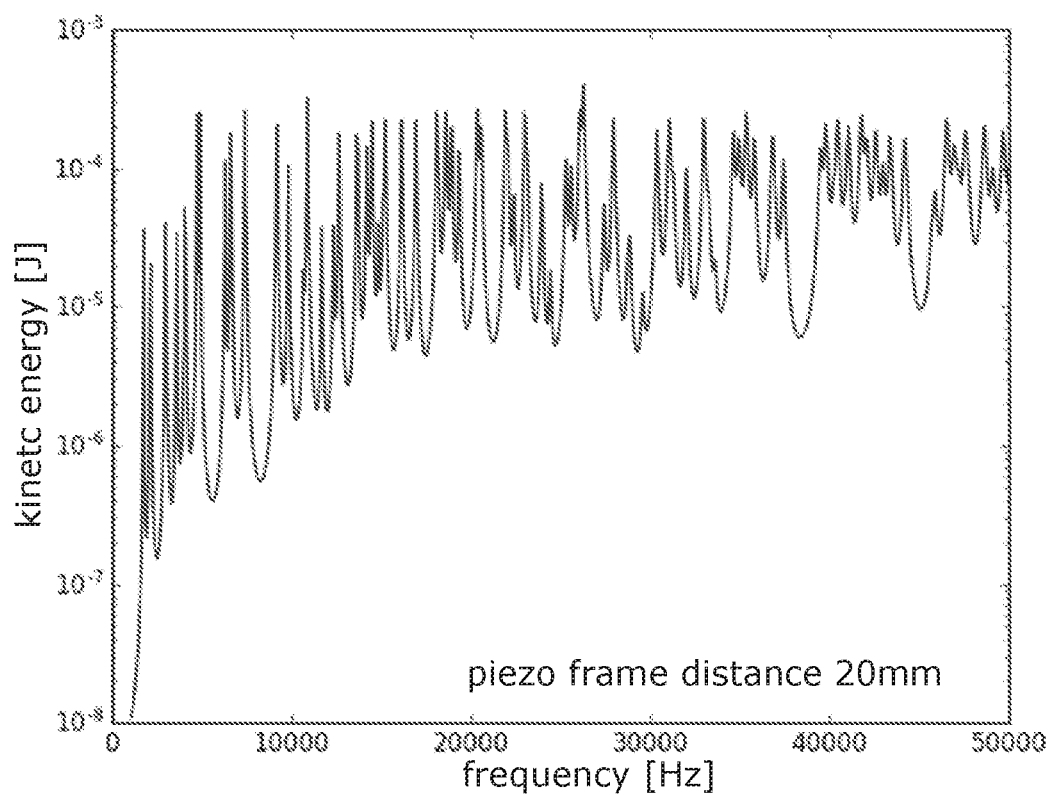
Figure 7:
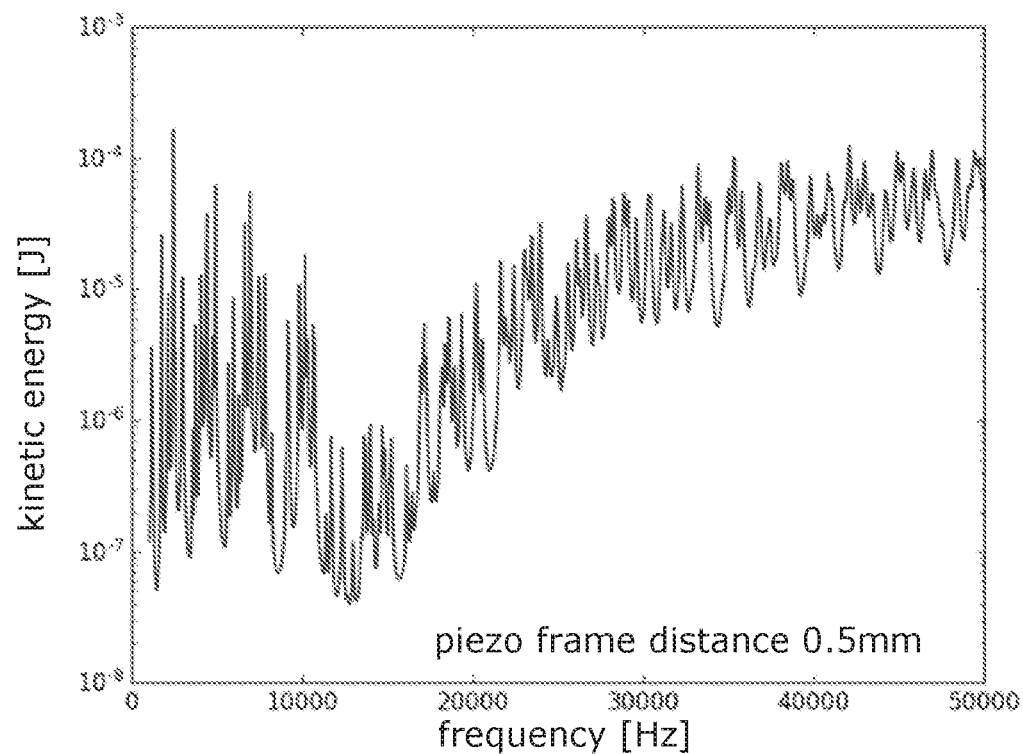
Figure 8:
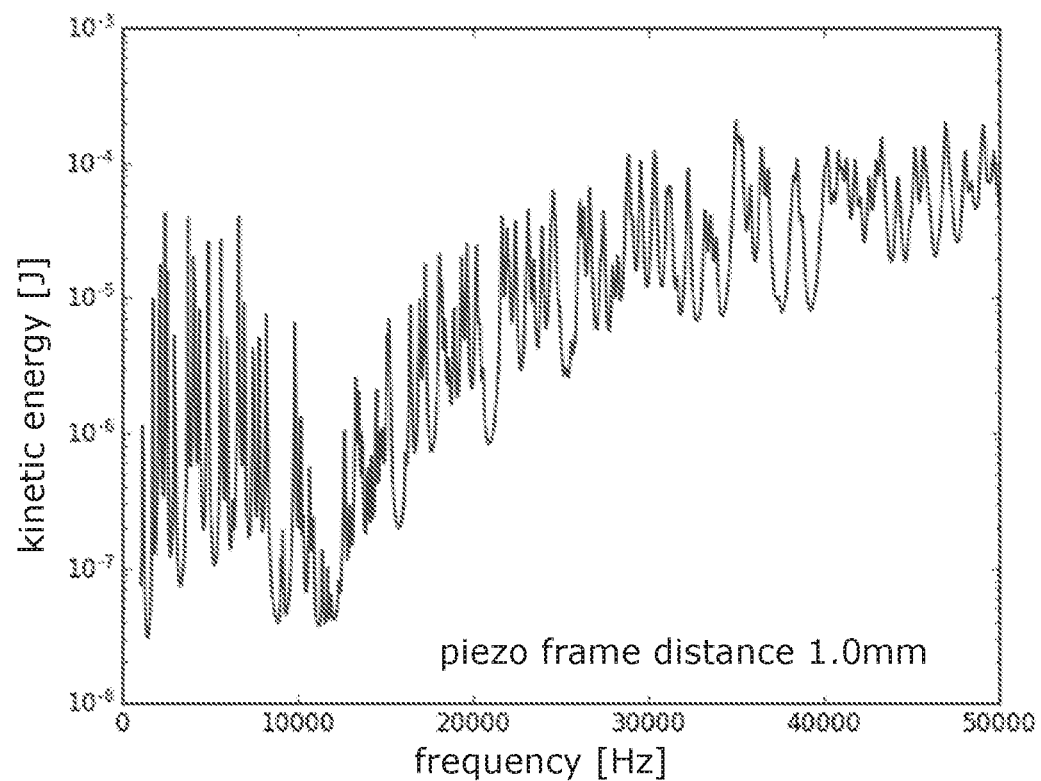
Figure 9:
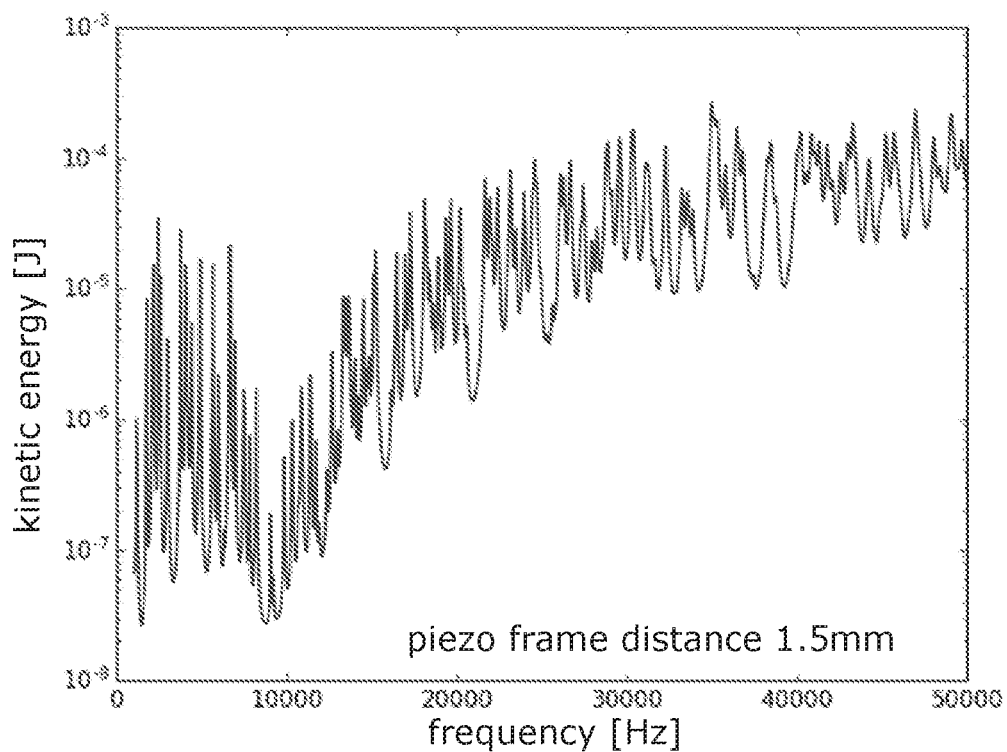
Figure 10:
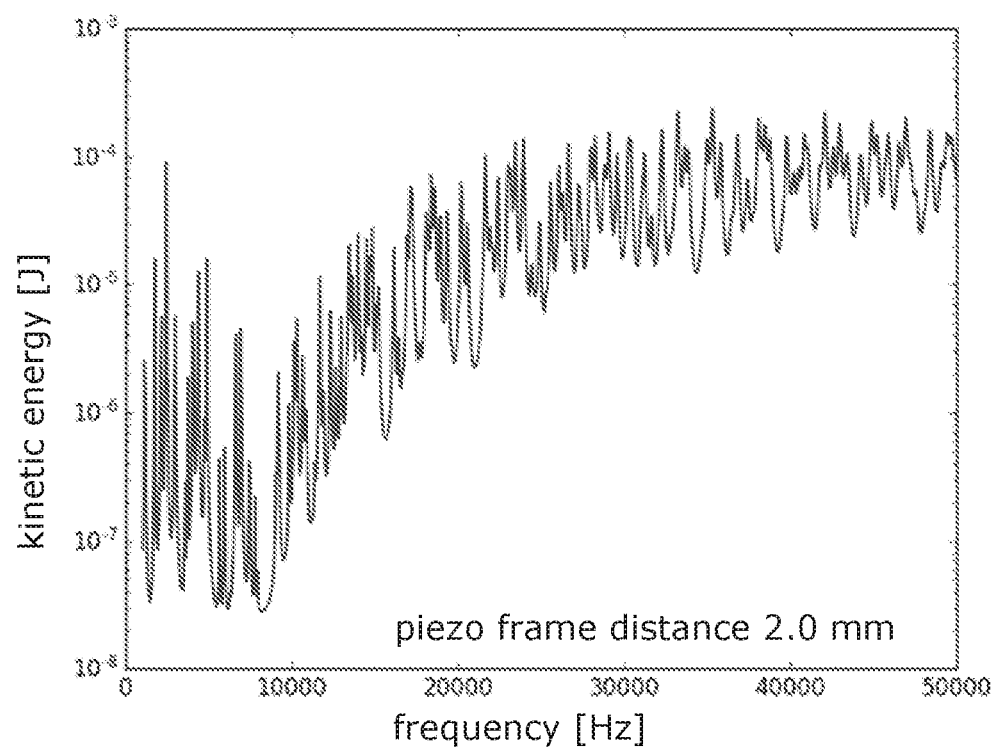

It has already been explained above how distance a can be determined approximately so that flexure waves with frequencies in the audible spectrum (e.g. up to 20,000 Hz), which are impressed by the actuators into cover pane 18, only propagate in a damped form or not at all in cover pane 18. FIGS. 6 to 10 show simulation curves for different distances and the thus resulting frequency responses. The reference curve in FIG. 6 is based on an actuator with a large distance to the edge (20.0 mm). Approximately the same amount of energy is coupled into the cover pane over the entire frequency range. The curves shown in FIGS. 7 to 10 belong to systems in which the actuator is placed very close to the edge, namely in FIG. 7 at a distance of 0.5 mm, in FIG. 8 at a distance of 1.0 mm, in FIG. 9 at a distance of 1.5 mm and in FIG. 10 at a distance of 2.0 mm. The damping in the audible range (up to 20,000 Hz) and the effect of the distance on the spectral distribution are clearly recognizable.

The aforementioned simulation curves were created without additionally using the comb structure element 42 with the comb structure.

Figure 11:
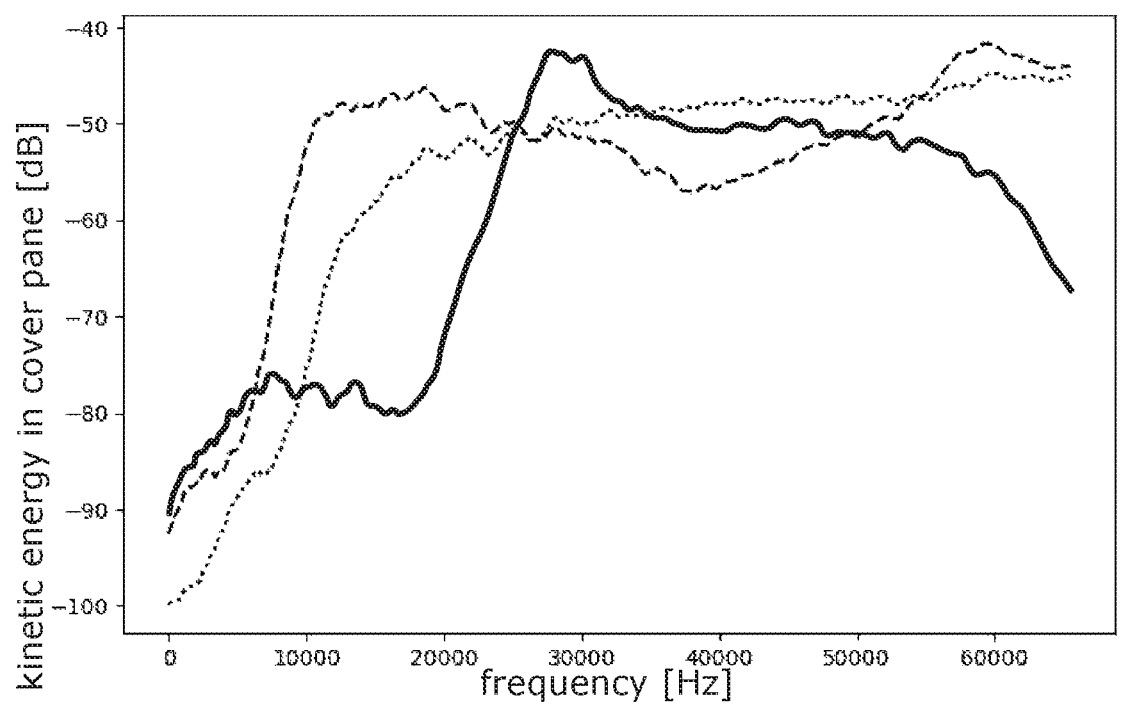

FIG. 11 shows that simulations result in the fact that by using comb structure element 42 with the comb structure forming the chambers, far better results can be achieved than without the chambers.

FIG. 11 shows damping profile for various scenarios. The dashed line shows the damping profile for the case that the actuators are arranged at a suboptimal selected distance from the edge. The dotted line shows the damping profile for the case that the actuators are arranged in a specifically selected distance in order to damp the flexure waves having frequencies in the audible range. Finally, the continuous line shows the damping profile for the case that the actuators are arranged in an optimized distance from the edge and that additionally comb structure element 42 with comb structure and individual chambers is used. All damping profile curves are simulations on the assumption of a cover pane 18 made of tampered glass. According to the continuous line, audible frequencies (up to approx. 20,000 Hz) are damped by approx. 30 dB more than ultrasonic frequencies. It is shown that using comb structure element 42 results in a significant improvement compared to the concept of a specific distance selection, which already shows a positive impact on the damping of flexure waves with frequencies in the audible range, but these flexure waves cannot yet be completely suppressed (see dotted line in FIG. 11), which however is possible when using comb structure element 42.

In the following, a further special feature according to one exemplary embodiment of the invention shall be explained with reference to FIGS. 12 and 13. FIG. 12 shows that an air gap 58 is located below cover pane 18 which allows that cover pane 18 can "vibrate" freely if flexure waves are impressed by means of the actuators 24. A connection to touch panel 60 or, if the touch sensor system is not designed as a touch panel but in another way, to display 62 (optionally with backlight unit—not illustrated) would be counterproductive and would damp the propagation of flexure waves too much. However, a disadvantage of air gap 58 is that impurities and particularly humidity could accumulate therein.

Thus, it is more advantageous if cover pane 18 is bonded to touch panel 60 or, if such a touch panel 60 is not provided, to display 62 by means of optical bonding. Optical bonding for displays is generally known. Suitably, a flexible material is used as bonding mass 64 which does not or not significantly damp flexures waves propagating in cover pane 18.

In the exemplary embodiments shown in FIGS. 12 and 13, comb structure element 42 of the exemplary embodiment shown in FIGS. 1 to 5 can additionally be used if desired.

The aforementioned elastic bonding of the cover pane or, in general, of the operating surface to adjacent components of the operating unit, which are arranged below the operating surface, relates to an object which can be realized without necessarily requiring the herein described impression of flexure waves according to the invention.

The invention has been described above based on the example of noiseless impression of flexure waves into the cover pane of a display. However, the invention can also be used for operating units comprising an unchangeable operating panel with "fixed" operating fields. Imprinted/engraved or embedded graphical or alphanumeric information, which define various operable functions of a device, are located on the operating panel. The operating panel is made of, for example, non-transparent "hard" material, such as metal or hardened metal. Preferably, metal or material is used with a modulus of elasticity of at least 40 to 50 GPa. In such an operating unit, the operating panel and the frame as well as the comb structure element can be integrally formed, which can be achieved, for example, by machining a basic material such as metal (or also hardened glass) or by casting. All elements essential for the invention, such as touch surface, frame for reflecting flexure waves and the piezo chamber (i.e. the comb structure element) form a common element. Thus, the error-prone and difficult to produce adhesive bonds between the touch surface and the frame, including the comb structure element, can be completely omitted.

Such an alternatively structured system comprises at least one of the feature groups described in the following:

1. Operating unit for a vehicle component, particularly human-machine-interface (HMI) for a vehicle, comprising
    a housing 14 having a frame 16,
    an operating panel arranged in and/or at housing 14 with an operating surface having operating fields,
    a touch sensor system 40 arranged in and/or at housing 14, and
    a plurality of actuators 24 arranged adjacently along edge 22 of the operating panel for introducing flexural waves into the operating panel,
    wherein each actuator 24 at the operating panel is assigned a contact surface 34 by means of which actuator 24 acts on the operating panel in order to introduce flexural waves into the operating panel,
    wherein the flexural waves introduced by the actuators 24 into the operating panel are superposed in the operating panel and provide the operating panel with a tactilely sensible, locally resolved surface structure,
    wherein the contact surfaces 34 are each arranged at a distance from frame 16 of housing 14, and consequently the introduction of flexural waves into the operating panel and/or the propagation of flexural waves in the operating panel is damped for wavelengths or frequencies resulting from the magnitude of the distance, and
    wherein the distance is selected in such a way that flexural waves having frequencies in the audible frequency range are damped, and
    an evaluation and control unit 38 connected to touch sensor system 40 and actuators 24 for controlling touch sensor system 40 in order to evaluate the signals provided by touch sensor system 40, and for controlling actuators 24 depending on the signals provided by touch sensor system 40.

2. Operating unit according to item 1, characterized in that the distance is the space between frame 16, in a direction orthogonal thereto, and the respective contact surface 34.

3. Operating unit according to item 2, characterized in that the distance is the space between frame 16 and the geometrical center of contact surface 34.

4. Operating unit according to any one of items 1 to 3, characterized in that each contact surface 34 is a circular surface.

5. Operating unit according to any one of items 1 to 4, characterized in that arms 44 glued to the operating panel extend inwards from frame 16 of housing 14 and form individual chambers 48 arranged along frame 16, in each of which a contact surface 34 is arranged and which are open on their inner sides facing towards central area 50 of the operating panel.

6. Operating unit according to item 5, characterized in that the arms are connected at their endings facing towards frame 16 by means of the base sections 46, and in that the arms 44 and the base sections 46 form a comb structure element glued onto the operating panel.

7. Operating unit according to item 7, characterized in that the arms 44 are integrally connected to frame 16.

8. Operating unit according to any one of items 5 to 7, characterized in that the chambers 48 comprise at their inner sides facing towards central area 50 of the operating panel respectively one opening 52 extending over 60° to 120°, particularly over 90° of the circumference of the respective chamber.

9. Operating unit according to item 8, characterized in that opening 52 is symmetric to a symmetry axis of the chamber running orthogonally to frame 16.

10. Operating unit according to any one of items 5 to 9, characterized in that the chambers 48 are each symmetric.

11. Operating unit according to any one of items 1 to 10, characterized in that each contact surface 34 is a circular surface, and in that the arms 44 and frame 16 form a chamber 48 per contact surface 45 with an inner circumference running concentrically to contact surface 34, and with a bottom surface running concentrically to contact surface 34.

12. Operating unit according to any one of items 1 to 11, characterized in that the actuators 24 are designed as piezo actuators with respectively one particularly circular, disc-shaped, single-layer or multi-layer piezo element 26 which is glued to the operating panel on the respective contact surface 34.

13. Operating unit according to any one of items 1 to 12, characterized in that touch sensor system 40 comprises ultrasonic transmitters and ultrasonic receivers which are rigidly bonded, particularly glued, to the operating panel for impressing ultrasonic flexure waves into the operating panel for a locally resolved detection of point 56 on the operating panel touched by an object, particularly by the finger of a person.

14. Operating unit according to item 13, characterized in that the ultrasonic transmitters and the ultrasonic receivers are each formed as single-layer or multi-layer piezo elements 26.

15. Operating unit according to any one of items 13 or 14, characterized in that the functions of the ultrasonic transmitters and the ultrasonic receivers can be executed by some of the actuators 24, namely in a first phase of touching the operating panel, wherein the corresponding first actuators 24 are provided in a second phase of touching for impressing flexure waves into the operating panel for tactile feedback of the touch on the respective previously detected touch point 56.

16. Operating unit according to any one of items 1 to 12, characterized in that touch sensor system 40 comprises a touch panel 60 for a locally resolved detection of point 56 on the operating panel touched by an object, particularly by the finger of a person.

17. Operating unit according to item 16, characterized in that the touch panel is arranged at a distance to the operating panel.

18. Operating unit according to item 17, characterized in that the distance is filled by air or adhesive material.

19. Operating unit according to any one of the preceding items, characterized in that the operating panel, the frame and the comb structure element are designed as an integral unit (for example by casting or machining, e.g. milling), and in that the unit comprises metal, optionally hardened metal.

The features included in the preceding items as well as in the dependent claims shall also be considered as independent variants of the inventions without referring to one or several other items or one or several other claims, provided that the features included in the individual items and/or the features included in the individual dependent claims refer to an operating unit for a vehicle component, particularly a human-machine-interface (HMI) for a vehicle, which is provided with a housing with a frame, a display arranged in and/or at the housing with a transparent cover pane having an edge which is enclosed by the frame, a touch sensor system arranged in and/or at the housing, and a plurality of actuators arranged adjacently along the edge of the cover pane for introducing flexural waves into the cover pane, wherein each actuator at the cover pane is assigned to a contact surface by means of which the actuator acts on the cover pane in order to introduce flexural waves into the cover pane, wherein the flexural waves introduced by the actuators into the cover pane are superposed in the cover pane and provide the cover pane with a tactilely sensible, locally resolved surface structure, and an evaluation and control unit connected to the touch sensor system and the actuators for controlling the touch sensor system in order to evaluate the signals provided by the touch sensor system, and for controlling the actuators depending on the signals provided by the touch sensor system.

LIST OF REFERENCE NUMERALS

10 operating unit
12 operating surface
14 housing
16 frame
18 cover pane
20 adhesive layer
22 edge
24 actuator
26 piezo element
28 electrode of piezo element
30 electrode of piezo element
32 adhesive bond
34 contact surface
36 bottom face
38 control unit
40 touch sensor system
42 comb structure element
44 arms
46 base sections
48 chambers
50 central area of cover pane
52 opening in chamber
54 darkened/blackened edge area
56 touch point
58 air gap between cover pane and touch panel
60 touch panel
62 display
64 bonding mass

The invention claimed is:

1. An operating unit for a vehicle component, including a human-machine interface (MMI or HMI) for a vehicle, the operating unit comprising:

a housing with a frame, a display arranged in and/or at the housing with a transparent cover pane having an edge which is enclosed by the frame, a touch sensor system arranged in and/or at the housing, and a plurality of actuators arranged adjacently along the edge of the cover pane for introducing flexural waves into the cover pane, wherein each actuator on the cover pane is assigned to a contact surface by means of which the actuator acts on the cover pane in order to introduce flexural waves into the cover pane, wherein the flexural waves introduced by the actuators into the cover pane are superposed in the cover pane and provide the cover pane with a tactilely sensible, locally resolved surface structure, and wherein the contact surfaces are each arranged at a distance from the frame of the housing, and consequently the introduction of flexural waves into the cover pane and/or the propagation of flexural waves in the cover pane is damped for wavelengths or frequencies resulting from the magnitude of the distance, and wherein the distance is selected in such a way that flexural waves having frequencies in the audible frequency range are damped, and an evaluation and control unit connected to the touch sensor system and the actuators for controlling the touch sensor system in order to evaluate the signals provided by the touch sensor system, and for controlling the actuators depending on the signals provided by the touch sensor system, wherein arms glued to the cover pane extend inwards from the frame of the housing and form individual chambers arranged along the frame, in each of which one of the contact surfaces is arranged and which are open on their inner sides facing towards the central area of the cover pane, wherein the arms are connected at their endings facing towards the frame by base sections, and in that the arms and the base sections form a comb structure element inwards from the frame and glued onto the cover pane to frame the cover pane.

2. The operating unit according to claim 1, wherein the distance is the space between the frame, in a direction orthogonal thereto, and the respective contact surface.

3. The operating unit according to claim 2, wherein the distance is the space between the frame and the geometrical center of the contact surface.

4. The operating unit according to claim 1, wherein each contact surface is a circular surface.

5. The operating unit according to claim 1, wherein the cover pane comprises a gap relative to the display.

6. The operating unit particularly according to claim 1, wherein the cover pane is bonded to the display or to the touch sensor system by a layer of a transparent, elastic adhesive material.

7. The operating unit according to claim 1, wherein the arms are integrally connected to the frame.

8. The operating unit according to claim 1, wherein the chambers comprise at their inner sides facing towards the central area of the cover pane respectively one opening extending over 60° to 120° of the circumference of the respective chamber.

9. The operating unit according to claim 8, wherein the opening is symmetric to a symmetry axis of the chamber running orthogonally to the frame.

10. The operating unit according to claim 1, wherein the chambers are each symmetric.

11. The operating unit according to claim 1, wherein each contact surface is a circular face, and in that the arms and the frame form a chamber per contact surface with an inner circumference running concentrically to the contact surface, and with a bottom surface running concentrically to the contact surface.

12. The operating unit according to claim 1, wherein the actuators are formed as piezo actuators with respectively one particularly circular, disc-shaped, single-layer or multi-layer piezo element which is glued to the cover pane on the respective contact surface.

13. The operating unit according to claim 1, wherein the touch sensor system comprises ultrasonic transmitters and ultrasonic receivers which are rigidly bonded or glued to the cover pane for impressing ultrasonic flexure waves into the cover pane for a locally resolved detection of the point on the cover pane touched by an object.

14. The operating unit according to claim 13, wherein the ultrasonic transmitter and the ultrasonic receiver are each formed as single-layer or multi-layer piezo elements.

15. The operating unit according to claim 13, wherein the functions of the ultrasonic transmitters and the ultrasonic receivers can be executed by some of the actuators, namely in a first phase of touching the cover pane, wherein the corresponding first actuators are provided in a second phase of touching for impressing flexure waves into the cover pane for a tactile feedback on touching at the respective previously detected touch point.

16. The operating unit according to claim 1, wherein the touch sensor system comprises a touch panel arranged between the cover pane and the display for a locally resolved detection of the point on the cover pane touched by an object.

17. The operating unit according to claim 1, wherein only one of the actuators is arranged in each of the individual chambers.

* * * * *